United States Patent
Juptner

(10) Patent No.: US 6,688,245 B2
(45) Date of Patent: Feb. 10, 2004

(54) CONTROLLER FOR A CULTIVATING AND SEEDING MACHINE

(75) Inventor: Detlef Juptner, Kleinblittersdorf (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/187,876

(22) Filed: Jul. 2, 2002

(65) Prior Publication Data

US 2003/0024450 A1 Feb. 6, 2003

(30) Foreign Application Priority Data

Jul. 7, 2001 (DE) .......................... 101 33 191

(51) Int. Cl.7 .............................................. A01B 49/06
(52) U.S. Cl. ............................. 111/200; 172/2; 701/50
(58) Field of Search ........................... 111/200; 701/50; 172/2, 4, 4.5, 12

(56) References Cited

U.S. PATENT DOCUMENTS 6,003,455 A    12/1999   Flamme et al. ............. 111/200

FOREIGN PATENT DOCUMENTS

| DE | 25 28 930     | 1/1977  |
|----|---------------|---------|
| DE | 25 35 268     | 2/1977  |
| DE | 37 08 324 A1  | 9/1988  |
| DE | 196 20 016 A1 | 11/1997 |
| DE | 196 41 765 A1 | 4/1998  |
| DE | 197 33 210 A1 | 2/1999  |
| DE | 198 04 293 A1 | 8/1999  |
| DE | 198 04 740 A1 | 8/1999  |
| DE | 198 06 467 A1 | 10/1999 |
| DE | 198 21 394 A1 | 11/1999 |
| DE | 198 36 780 A1 | 2/2000  |
| DE | 198 44 395 A1 | 3/2000  |
| DE | 198 55 937 A1 | 6/2000  |
| DE | 198 59 875 A1 | 6/2000  |
| EP | 0 255 630     | 2/1988  |
| EP | 0 928 553 A2  | 7/1999  |

*Primary Examiner*—Christopher J. Novosad

(57) ABSTRACT

A cultivating and seeding machine is provided with a seeding unit and a tillage device and/or a land roller. The seeding unit is provided with a seeding actuator, the tillage device is provided with a tillage actuator and the land roller is provided with a land roller actuator. The seeding actuator regulates the sowing depth of the seeding unit, whereas the tillage and land roller actuators regulates the downward pressure of these two implements, respectively. A controller having a memory loaded with information for adjusting the working implements, controls the various actuators in response to these data records.

17 Claims, 1 Drawing Sheet

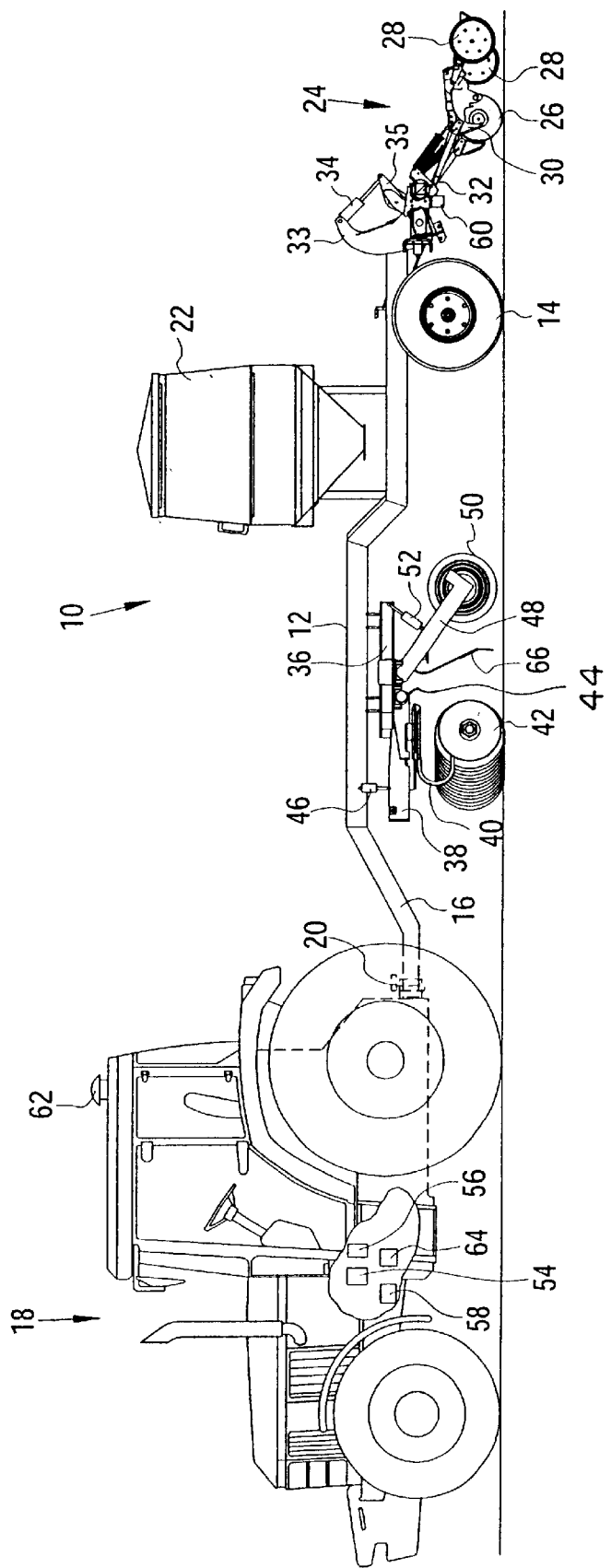

CONTROLLER FOR A CULTIVATING AND SEEDING MACHINE

FIELD OF THE INVENTION

The present invention is directed to an agricultural cultivating and seeding machine, having a frame that is provided with tillage devices and/or a land roller and at least one seeding unit, wherein actuators are provided for adjusting the working depth and/or the working pressure of at least two different working elements.

BACKGROUND OF THE INVENTION

Seeder machines equipped with tillage devices, also designated as cultivating and seeding combinations, are known in the prior art. They can be used after a plowing or stubble operation. In many seeder machines the working depth of the seeding units and/or tillage devices can be changed.

For example, in the Väderstad Rapid F seeder, the depth setting of the disk pair can be adjusted to a pre-set delivery depth by hydraulic cylinders. The Horsch DS/D 6 seeder comprises tillage devices on an equipment carrier that can be hydraulically adjusted in height. The Amazone Airstar Xpress drilling machine makes it possible to adapt the share pressure, and the pressure on the rake that follows the share, to the particular soil conditions hydraulically. Its tillage device, which is mounted in front, can be mechanically adjusted in height. DE 198 21 394 A describes a cultivating combination in which a tillage device can be adjusted in height relative to a carrier frame. A height-adjustable land roller is provided on the back side of the cultivating combination, on which roller the cultivating combination is supported.

The coupling of several elements of seeders to each other and adjusting them in common is also known. Thus, DE 198 04 293 A, DE 198 06 467 A and DE 198 55 937 A suggest fastening seeding shares, with spring-suspension roller elements in front, to a share frame. The share frame can be adjusted in height, relative to a carrier frame of the cultivating combination, by a coupling device. Thus, the seeding share and the roller elements are jointly adjusted in height. DE 196 20 016 A discloses a cultivating combination in which a land roller and tillage devices are fastened to a common frame fastened to the main frame. The land roller can be adjusted in height relative to the tillage devices such that its position defines the working depth of the tillage devices. DE 196 41 765 A additionally suggests that the height of the drawbar in such a cultivating combination be adjusted in order to adjust the working depth of the tillage devices or a leveling track in front of this equipment. According to DE 198 36 780 A, a land roller that is height-adjustable and defines the working depth of the tillage device is associated with the tillage device of a cultivating combination. The land roller is adjusted in height jointly with the tillage device.

In sum, it can be determined in the prior art that either different elements of the seeder are adjusted individually, which has the disadvantage that changing adjustment of several elements, which can be necessary if the soil properties change or the seed changes, is complex and time-consuming; or several elements are mechanically coupled together. This, however, limits the degree of freedom.

SUMMARY OF THE INVENTION

It is an object of the present invention to provide a cultivating and seeding machine having a controller that can bring several working implements readily into their respective working positions.

The cultivating and seeding machine is provided with a seeding machine and a tillage device and/or a land roller. The seeding machine is provided with a seeding actuator for controlling the sowing depth of the seeding machine. The tillage device is provided with a tillage actuator for controlling the tillage downward pressure of the tillage device. The land roller is provided with a land roller actuator for controlling roller downward pressure. In the illustrated embodiment the actuators are hydraulic cylinders, although rotating hydraulic or electric motors can also be used. At least two of the actuators are connected to a controller that controls the operating parameters of the actuators. The controller controls the flow of pressurized hydraulic fluid to the actuators with or without feedback from an appropriate sensor. The controller is loaded with data records containing information for adjusting at least two of the actuators. The actuators, and with them the working elements, are respectively brought into the positions required using the data records.

It is possible in this manner to bring several working elements of the cultivating combination into their prescribed positions by retrieving a single data record. Operation of the cultivating and seeding machine is significantly simplified.

It is not absolutely necessary to store complete data records for controlling all actuators if the data records are derived by the controller from stored data. Thus, for example, data dependent on the soil type can be filed in a table, and data records can be retrieved from another table using this table or calculated algorithmically using appropriate mathematical instructions. The advantage is a reduction of the amount of data to be stored and the possibility of interpolation. It is also conceivable to derive the parameters for two working elements from the selectable data for one working element. Thus, the operator can input a value for the sowing depth and the controller can set the pressure of the land roller and the position of the tillage devices using the selected sowing depth.

In an especially simple embodiment of the invention, the data records can in particular be retrieved by an operator manually. The data record considered to be significant, as a function, e.g., of the soil type, soil moisture or of other conditions is selected by a keyboard or a touch-sensitive screen or by speaking.

As an alternative or in addition, a map can be stored in which the data records, or data from which the data records can be derived, are stored as a function of the particular position. The data is retrieved from the stored map using the actual position of the cultivating combination, or of a vehicle pulling it, determined by a position detection system (e.g., GPS, DGPS or some other satellite system or an inertial navigation system), and [said data is] used to control the actuators.

The soil type, soil moisture, air and/or soil temperature, type of seed, and weather conditions such as the current or forecast amount of rain, solar radiation, etc., or any combination of these can be cited as data on which the operating values of the actuators can be dependent. Using suitable computer instructions, the data records for defining the prescribed operating values for the actuators are determined from this data, which can be input or detected by appropriate sensors or transmitted by remote data transmission.

During road travel and/or in headlands, the operating values of the actuators of the cultivating combination differ from the operating values when working a field since in these instances the working elements must be raised. In order to facilitate the work for the operation it is possible to design a data record to be retrieved for headland or road travel. This can be effected by manually pressing a key or by using a position detection system that makes it possible to recognize, using a map, whether a field is to be worked or a headland or a road is to be traveled.

Such a position detection system avoids unintended double working of a section of a field by comparing the actual position with stored information about the already worked areas. If the comparison shows that the particular area being traversed has already been worked, the working elements are automatically moved to a non-operational position. A manual override control is of course conceivable.

BRIEF DESCRIPTION OF THE DRAWING

FIG. 1 is a side view of a cultivating combination in accordance with the invention, coupled to a tractor.

DETAILED DESCRIPTION

FIG. 1 shows an agricultural cultivating combination 10. It comprises frame 12 that is supported by ground engaging wheels 14. The front of the frame 12 is provided with a forwardly extending tongue 16 that is coupled to a hitch 20 extending rearwardly from a tractor 18.

A seed hopper 22 is mounted to the frame 12 in front of ground engaging wheels 14. A seed meter, not shown, meters the seed contained in the seed hopper. The metered seed is then transported to seeding units 24 by seed hoses, also not shown. Each of the seeding units 24 comprises a furrow opener 26 in the form of a disk, a plow share 30, and closing wheels 28. The plow share 30 has a passage defining a seed tube for receiving metered seed from the seed hoses and directing the metered seed into the planting furrow formed by the furrow opener 26. The closing wheels 28 close the planting furrow with the metered seed contained therein.

A plurality of seeding units 24 are supported on the transversely extending tool carrier 32. These seeding units 24 are arranged side-by-side on the tool carrier 32. The tool carrier 32 is supported on and extends rearwardly from frame 12. The seeding units 24 are pivotally mounted to the tool carrier 32 so they can pivot about an axis parallel to the longitudinal axis of the tool carrier 32. The pivot angle of the seeding units 24, and thereby the sowing depth, is fixed by seeding actuator 34 in the form of a hydraulic cylinder, extending between mount 33 on frame 12 and arm 35 coupled to seeding units 24.

A carrier frame 36 is fastened to the bottom of frame 12 in front of seed hopper 22. Carrier frame 36 holds pivot frame 38 that can pivot about horizontal pivot axis 44 that extends transversely to the direction of travel. A tillage device 42 in the form of a disk harrow is supported on this pivot frame 38 via U-shaped spring 40. A tillage actuator 46, in the form of a hydraulic cylinder, is arranged between frame 12 and pivot frame 38. The tillage actuator 46 defines the pivot angle of pivot frame 38 about pivot axis 44. Tillage actuator 46 can be operated with an adjustable pressure and in this manner controls the tillage downward pressure with which tillage device 42 acts on the ground. In place of the illustrated disk harrow, any other tillage device 42 can be used.

Mount 48 is pivotally attached to the carrier frame 36 and pivots about a pivot axis that is parallel to the pivot axis 44. In the illustrated embodiment, the mount 48 is located behind the tillage device 42. A land roller 50 in the form of a tire packer is attached on the lower end of the mount 48.

A land roller actuator 52, in the form of a hydraulic cylinder, extends between carrier frame 36 and mount 48 and defines the pivot angle of mount 48. Land roller actuator 52 can be loaded with an adjustable pressure and in this manner controls the roller downward pressure with which land roller 42 acts on the ground. Instead of a tire packer, any type of roller could be used, e.g., oblique-rod packer rollers, tubular-rod packer rollers, disk packer rollers, toothed packer rollers, spiral packer rollers, and polygon rollers. Land roller 50 could also be designed as a front tire packer or support roller wherein the roller supports at least a part of the weight of the cultivating combination. In addition, the rollers 50 can also control the depth of penetration of the cultivating combination, in the course of which wheels 14 should be lifted up during a seeding operation. Instead of the rigid attachment of land roller 50 to mount 48 as shown, a spring may be interposed between the mount 48 and the rollers 50. Also, each individual wheel of land roller 50 could be controlled via an associated actuator 52.

It should be noted that U-shaped springs 40 connected to pivot frame 38 are arranged on both lateral ends of tillage device 42. Also, mounts 48 are arranged on both lateral ends of land roller 50 and are connected to carrier frame 36. Tillage device 42 and land roller 50 can be composed of three or more sections arranged side by side, of which the outermost can be folded up in a known manner for road transport. Appropriate drives in the form of hydraulic cylinders are to be provided for this purpose.

A rake 66 is connected to the carrier frame 36 between the tillage device 42 and land roller 50.

Tractor 18 is provided with controller 54 for directing pressurized hydraulic fluid to and from actuators 34, 46 and 52 from pressurized hydraulic fluid source 58 by means of hydraulic lines, not shown. The controller 54 controls this flow by a valve device 56 preferably containing proportional valves. In the embodiment shown, actuators 34, 46 and 52 are double-acting hydraulic cylinders in order to be able to lift up the working elements of cultivating combination 10 in headlands or during road travel. However, single-acting hydraulic cylinders are also conceivable. Controller 54 is thus designed to set the pressure of actuators 46, 52. Information about the position of actuator 34 is supplied to controller 54 via a sensor 60, so that the sowing depth of seeders 24 can be regulated by controller 54 by means of valve device 56.

Signals containing information about the actual position of tractor 18 is supplied to controller 54 from satellite receiver antenna 62 designed to receive GPS (global positioning system) signals. A target value map is filed in memory 64, this having been prepared on a computer before a tilling event and transferred in any manner (by an exchangeable data storage medium such as a diskette or in a wireless manner) to memory 64. The target value map was prepared using available information about the type of soil, type of seed and various other parameters to be taken into consideration when tilling. The farmer can test and modify the above. The map contains site-dependent information about the pressure of tillage device 42 on the ground, the pressure of land roller 50 on the ground and the sowing depth.

Data records containing information about the prescribed pressure of tillage device 42, the prescribed pressure of land roller 50, and the prescribed sowing depth are read out from the target value map in memory 64 when tilling a field using the information generated by satellite receiver antenna 62 about the correct location. A recalculation for compensating the offset between the position of satellite receiver antenna 62 and cultivating combination 10 or its working elements 24, 42 and 50 is also possible. Actuators 34, 46 and 52 are controlled in accordance with the data records by control 54 and valve device 56. Constant contact with the ground and a uniform, optimally adjusted soil pressure are possible by controlling the pressure of land roller 50. Actuators 34, 46 and 52 are caused to lift up the working elements of cultivating combination 10, that is, tillage device 42, land roller 50 and seeding device 24 at the headlands at the edges of a field.

Having described the preferred embodiment, it will become apparent that various modifications can be made without departing from the scope of the invention as defined in the accompanying claims.

I claim:

1. An agricultural cultivating and seeding combination that can move in a forward direction over a field, the agricultural cultivating and seeding combination comprising:
    a frame;
    a tillage device mounted to the frame, the tillage device having a tillage downward pressure, a tillage actuator extends between the tillage device and the frame for controlling the tillage downward pressure of the tillage device;
    a seeding unit mounted to the frame, the seeding unit having a working depth, a seeding actuator extends between the seeding unit and the frame for controlling the sowing depth of the seeding unit;
    a controller having a memory that can be loaded with data records containing information for adjusting the tillage actuator and the seeding actuator, the data records are derived from stored data, the data records are stored in a geo-referenced manner and are retrieved using positional data made available from a position detection system, wherein the controller controls the tillage actuator and the seeding actuator in response to these records.

2. The agricultural cultivating and seeding combination as defined by claim 1 wherein the data records can be retrieved by an operator.

3. The agricultural cultivating and seeding combination as defined by claim 1 wherein the data is dependent on the soil parameters.

4. The agricultural cultivating and seeding combination as defined by claim 3 wherein the data is dependent on the seed type.

5. The agricultural cultivating and seeding combination as defined by claim 4 wherein a data record can be retrieved for identifying the headland.

6. The agricultural cultivating and seeding combination as defined by claim 5 wherein the data record for headland is retrieved using the position, determined with a position detection system, and a stored map.

7. The agricultural cultivating and seeding combination as defined by claim 6 wherein the actuators are automatically moved to a non-operational position when traversing an area already tilled.

8. The agricultural cultivating and seeding combination as defined by claim 1 wherein the data is dependent on the seed type.

9. An agricultural cultivating and seeding combination that can move in a forward direction over a field, the agricultural cultivating and seeding combination comprising:
    a frame;
    a land roller mounted to the frame, the land roller having a roller downward pressure, a land roller actuator extends between the land roller and the frame for controlling the roller downward pressure of the land roller;
    a seeding unit mounted to the frame, the seeding unit having a working depth, a seeding actuator extends between the seeding unit and the frame for controlling the sowing depth of the seeding unit;
    a controller having a memory that can be loaded with data records containing information for adjusting the land roller and the seeding actuator, the data records are derived from stored data, the data records are stored in a geo-referenced manner and are retrieved using positional data made available from a position detection system, wherein the controller controls the land roller actuator and the seeding actuator in response to these records.

10. The agricultural cultivating and seeding combination as defined by claim 9 wherein the data records can be retrieved by an operator.

11. The agricultural cultivating and seeding combination as defined by claim 9 wherein the data is dependent on the soil parameters.

12. The agricultural cultivating and seeding combination as defined by claim 11 wherein the data is dependent on the seed type.

13. The agricultural cultivating and seeding combination as defined by claim 12 wherein a data record can be retrieved for identifying the headland.

14. The agricultural cultivating and seeding combination as defined by claim 13 wherein the data record for headland is retrieved using the position, determined with a position detection system, and a stored map.

15. The agricultural cultivating and seeding combination as defined by claim 14 wherein the actuators are automatically moved to a non-operational position when traversing an area already tilled.

16. The agricultural cultivating and seeding combination as defined by claim 9 wherein the data is dependent on the seed type.

17. The agricultural cultivating and seeding combination as defined by claim 9 further comprising a tillage device mounted to the frame, the tillage device having a tillage downward pressure, a tillage actuator extends between the tillage device and the frame for controlling the tillage downward pressure of the tillage device, wherein the controller can be loaded with data records containing information for adjusting the tillage actuator, wherein the controller controls the tillage actuator in response to these records.

* * * * *